United States Patent
Wei

(10) Patent No.: US 10,488,696 B2
(45) Date of Patent: Nov. 26, 2019

(54) TRANSPARENT DISPLAY SYSTEM AND DISPLAY METHOD THEREOF

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/051,749

(22) Filed: Aug. 1, 2018

(65) Prior Publication Data
US 2019/0129208 A1 May 2, 2019

(30) Foreign Application Priority Data
Nov. 1, 2017 (CN) .......................... 2017 1 1058901

(51) Int. Cl.
| | |
|---|---|
| *G02F 1/1334* | (2006.01) |
| *G02F 1/15* | (2019.01) |
| *G03B 21/56* | (2006.01) |
| *H04N 9/31* | (2006.01) |
| *G03B 21/14* | (2006.01) |
| *G09G 3/00* | (2006.01) |
| *G02F 1/1347* | (2006.01) |

(Continued)

(52) U.S. Cl.
CPC .......... *G02F 1/1334* (2013.01); *G02F 1/1347* (2013.01); *G02F 1/15* (2013.01); *G03B 21/147* (2013.01); *G03B 21/56* (2013.01); *G09G 3/002* (2013.01); *H04N 9/3185* (2013.01); *G02B 13/06* (2013.01); *G02F 1/13342* (2013.01); *G02F 1/133365* (2013.01); *G02F 2001/13312* (2013.01); *G02F 2001/13775* (2013.01); *G02F 2001/133627* (2013.01); *G02F 2201/38* (2013.01); *G02F 2201/44* (2013.01); *G02F 2203/01* (2013.01); *G02F 2203/48* (2013.01); *G03B 7/00* (2013.01); *G09G 2320/0626* (2013.01); *H01L 27/32* (2013.01)

(58) Field of Classification Search
CPC .... G03B 21/14; G03B 21/204; G03B 21/208; G03B 21/2013; G03B 21/2066; H04N 9/31; H04N 9/3185; G09G 3/002; G02F 1/15
USPC ............................................. 353/30, 31, 34, 37
See application file for complete search history.

(56) References Cited

U.S. PATENT DOCUMENTS

| | | | | |
|---|---|---|---|---|
| 3,552,822 | A | * 1/1971 | Altman | ................. G03B 21/625 |
| | | | | 353/67 |
| 2003/0142057 | A1 | 7/2003 | Niiyama et al. | |

(Continued)

FOREIGN PATENT DOCUMENTS

| | | |
|---|---|---|
| CN | 1423152 A | 6/2003 |
| CN | 105869036 A | 8/2016 |

*Primary Examiner* — William C. Dowling

(57) ABSTRACT

A transparent display system and a display method thereof are disclosed. The transparent display system includes a transparent display panel, a projecting apparatus and a control device. The transparent display panel includes a viewing side and a rear side opposite to the viewing side and is configured to display image information on the viewing side; the projecting apparatus is configured to project image information on the rear side of the transparent display panel; and the control device is configured to control synchronization between a display operation of the transparent display panel and a projection display operation of the projecting apparatus.

17 Claims, 6 Drawing Sheets

(51) Int. Cl.
    *G02B 13/06*     (2006.01)
    *G02F 1/1335*     (2006.01)
    *G02F 1/1333*     (2006.01)
    *G03B 7/00*     (2014.01)
    *H01L 27/32*     (2006.01)
    *G02F 1/133*     (2006.01)
    *G02F 1/137*     (2006.01)

(56) References Cited

U.S. PATENT DOCUMENTS

| | | | |
|---|---|---|---|
| 2013/0215347 A1* | 8/2013 | Tsukio | G02F 1/1334 349/42 |
| 2015/0358574 A1* | 12/2015 | Henion | H04N 5/7458 348/745 |
| 2017/0310940 A1* | 10/2017 | Perdices-Gonzalez | G09G 3/2092 |
| 2018/0131913 A1* | 5/2018 | Nakagoshi | H04N 9/317 |

* cited by examiner

TRANSPARENT DISPLAY SYSTEM AND DISPLAY METHOD THEREOF

CROSS-REFERENCE TO RELATED APPLICATION

The application claims priority to Chinese patent application No. 201711058901.6, filed on Nov. 1, 2017, the entire disclosure of which is incorporated herein by reference as part of the present application.

TECHNICAL FIELD

Embodiments of the present disclosure relate to a transparent display system and a display method thereof.

BACKGROUND

With the development of display technology, transparent display technology has been more and more applied in the daily life. As the transparent display technology, taken as a brand-new display technology, allows the observer to see the rear area through a display screen, the transparent display technology significantly improves the efficiency and convenience of man-machine interaction, and hence is applied in more and more fields, for instance, being applied in various fields such as vending machines, billboards, display windows, car head-up displays and laptops.

SUMMARY

An embodiment of the present disclosure provides a transparent display system, comprising a transparent display panel, a projecting apparatus and a control device; the transparent display panel includes a viewing side and a rear side opposite to the viewing side and is configured to display image information on the viewing side; the projecting apparatus is configured to project image information on the rear side of the transparent display panel; and the control device is configured to control synchronization between a display operation of the transparent display panel and a projection display operation of the projecting apparatus.

For example, the transparent display system according to an embodiment further comprises a photosensing device, the photosensing device is configured to detect brightness variation in a surrounding environment; and the control device is further configured to adjust display brightness of the transparent display panel or projection brightness of the projecting apparatus according to a detection result of the photosensing device.

For example, in the transparent display system according to an embodiment, a projection area of the projecting apparatus on the rear side of the transparent display panel is less than or equal to a display region of the transparent display panel.

For example, in the transparent display system according to an embodiment, a resolution of an image projected by the projecting apparatus on the rear side of the transparent display panel is identical to a resolution of an image displayed by the transparent display panel.

For example, in the transparent display system according to an embodiment, an anti-reflection layer is provided on an outer surface of the viewing side of the transparent display panel.

For example, in the transparent display system according to an embodiment, the transparent display panel includes first transparent electrodes, second transparent electrodes and a light adjustment film, and the light adjustment film is disposed between the first transparent electrodes and the second transparent electrodes.

For example, in the transparent display system according to an embodiment, the light adjustment film is a polymer dispersed liquid crystal (PDLC) layer, a polymer stabilized liquid crystal (PSLC) layer or an electrochromic (EC) material layer.

For example, in the transparent display system according to an embodiment, the transparent display panel includes a plurality of light adjustment structural layers superimposed to each other; each of the light adjustment structural layers includes a first transparent electrode, a second transparent electrode and a light adjustment film and the light adjustment film is disposed between the first transparent electrode and the second transparent electrode.

For example, in the transparent display system according to an embodiment, the light adjustment film is a PDLC layer, a PSLC layer or an EC material layer.

For example, in the transparent display system according to an embodiment, the plurality of light adjustment structural layers that superimposed are respectively configured to display different colors.

For example, in the transparent display system according to an embodiment, the projecting apparatus is a short throw projector with a throw ratio in the range of 0.2 to 1.0.

For example, in the transparent display system according to an embodiment, the short throw projector is a fish-eye short throw projector or a reflective short throw projector.

For example, in the transparent display system according to an embodiment, the control device includes: an image input unit configured to receive image information required to be displayed by the transparent display panel and the projecting apparatus; and a synchronous correction unit configured to control the synchronization between the display of the transparent display panel and the display of the image information by the projection of the projecting apparatus.

For example, in the transparent display system according to an embodiment, the synchronous correction unit includes a dividing part and an output part, the dividing part is configured to divide a single frame of image information into two paths of identical image information; and the output part is configured to simultaneously send the two paths of identical image information to the projecting apparatus and the transparent display panel so as to realize synchronous output of the image information.

For example, in the transparent display system according to an embodiment, the synchronous correction unit further includes a correction part, and the correction part is configured to correct distorted image information so as to improve a resolution of the image information.

For example, in the transparent display system according to an embodiment, the transparent display panel further includes alignment detectors disposed at preset positions, the alignment detectors are configured to acquire signals irradiated by the projecting apparatus and feed back detection results to the control device; and the control device is further configured to detect whether a projective region of the projecting apparatus on the rear side of the transparent display panel is aligned with a preset region of the transparent display panel.

Another embodiment of the present disclosure provides a display method, for any of the above-mentioned transparent display systems, and the method comprises: allowing the transparent display panel to display the image information on the viewing side; allowing the projecting apparatus to project the image information on the rear side of the transparent display panel for display; and controlling the synchronization of the image information displayed by the transparent display panel and the image information projected by the projecting apparatus.

For example, the display method according to an embodiment of the present disclosure further comprises: detecting whether a projective region of the projecting apparatus on the rear side of the transparent display panel is aligned with a preset region of the transparent display panel.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
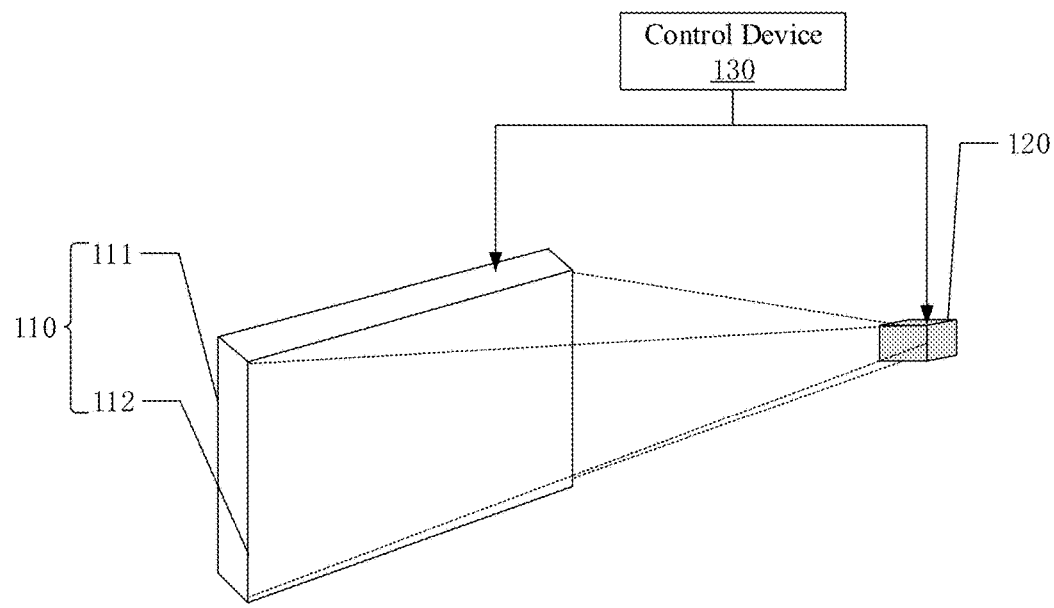
FIG. 1A is a schematic diagram of a transparent display system provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Transparent display technology may include two types according to different displays. One type is liquid crystal display (LCD) transparent display technology which achieves transparent display by mainly utilizing external light or backlight rearrangement. The other type is organic light-emitting diode (OLED) transparent display technology or plasma transparent display technology which includes a self-luminous display device. However, as for the LCD transparent display technology, although the structure of an LCD is simple, the transmittance is low, and high power consumption backlight proposal is required, so the requirement on the application environment is relatively high. As for the OLED transparent display technology, although the transmittance of an OLED can be made relatively high, the yield is relatively low, so the production cost is high and wide application cannot be realized. Some other transparent display technologies also have the problem of color display or display non-uniformity and can be difficult to achieve good transparent display effect.

At least an embodiment of the present disclosure provides a transparent display system, which comprises a transparent display panel, a projecting apparatus and a control device. The transparent display panel includes a viewing side and a rear side opposite to the viewing side and is configured to display image information on the viewing side. The projecting apparatus is configured to project image information on the rear side of the transparent display panel. The control device is configured to control the synchronization between a display operation of the transparent display panel and a projection display operation of the projecting apparatus.

The transparent display system can synchronously display the image information of the transparent display panel and the image information projected by the projecting apparatus, and the image information projected by the projecting apparatus is superimposed to the image information of the transparent display panel, so what the viewer sees is the superimposed image information. Therefore, the transparent display system can effectively improve the display effect and achieve high-transparency display.

The detailed description on known functions and known components may be omitted for the following clear and simple description of the embodiments of the present disclosure. When any component in the embodiment of the present disclosure appears in more than one accompanying drawings, the component is represented by the same reference numeral in each accompanying drawing.

FIG. 1A is a schematic diagram of a transparent display system provided by an embodiment of the present disclosure. As shown in FIG. 1A, the transparent display system comprises a transparent display panel 110, a projecting apparatus 120 and a control device 130. The transparent display system, for instance, may be applied to a display window or an exhibition cabinet. For example, the transparent display panel 110 can be used as the wall facing viewers, and an exhibit, for instance, placed in a space behind the transparent display panel 110, so the viewer can acquire, for instance, corresponding introduction information of the exhibit through the transparent display panel, and meanwhile, can see the exhibit. Further, if required, the projecting apparatus 120 can project image information to be displayed on the transparent display panel, and the image information is presented via the transparent display panel to viewers.

For instance, the transparent display panel 110 includes a viewing side 111 and a rear side 112 opposite to the viewing side 111 and is configured to receive and display image information on the viewing side 111, so that the viewer can see the image information displayed on the viewing side 111. The transparent display panel 110 not only can achieve display but also allows light from the rear side 112 to run through, so that the viewer can see background content at the rear of the transparent display panel, for instance, seeing the background including the exhibit, etc. Moreover, after the projecting apparatus 120 projects the image information displayed by the projecting apparatus on the rear side of the transparent display panel 110, the viewer can also see the image information.

For instance, as shown in FIG. 1A, the planar shape of the transparent display panel 110 is a rectangle. The planar shape of the transparent display panel 110 may also be other regular or irregular shapes, for instance, may be planar shapes such as a circle, an ellipse or a polygon.

Figure 2A:
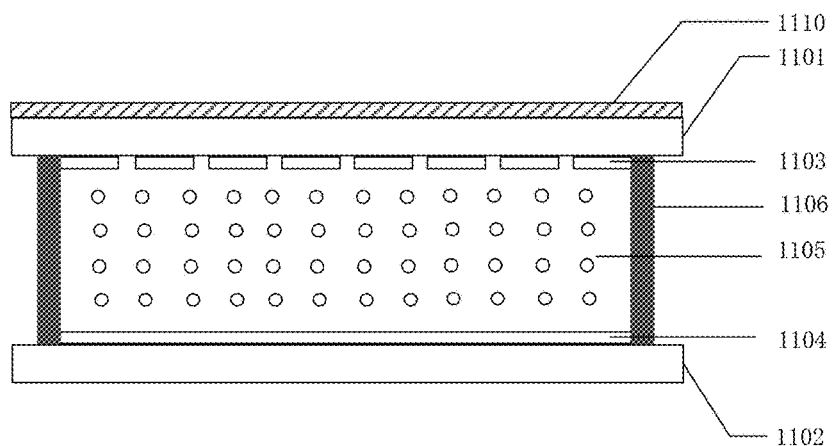
FIG. 2A is a schematic structural view of a transparent display panel of a first example in the transparent display system as shown in FIG. 1A.

The transparent display panel 110 may have multiple structures. No limitation will be given here in the embodiment of the present disclosure. For instance, in the first example, as shown in FIG. 2A, the transparent display panel 110 includes a first transparent substrate 1101, a second transparent substrate 102, a plurality of first transparent electrodes 1103, a plurality of second transparent electrodes 1104 and a light adjustment film 1105. In this example, a part or the whole of the display area of the transparent display panel 110 can be switched between a transparent state and a display state. In the transparent state, the transparent display panel 110 works as a transparent glass plate which allows viewers to see the objects and so on behind the transparent glass plate; in the display state, the transparent display panel 110 works as a light scattering glass plate which allows the image information projected by the projecting apparatus 120 on the transparent display panel 110 to be watched by viewers.

The first transparent electrodes 1103 are disposed on the first transparent substrate 1101, are disposed on the inside of the first transparent substrate 1101 as shown in FIG. 2A, and may also be disposed on the outside of the first transparent substrate in another example. The plurality of second transparent electrodes 1104 are disposed on the second transparent substrate 1102, are disposed on the inside of the second transparent substrate 1102 as shown in FIG. 2A, and may also be disposed on the outside of the second transparent substrate in another example. The light adjustment film 1105 is disposed between the first transparent electrodes 1103 and the second transparent electrodes 1104, and is controlled by voltage signals applied to the first transparent electrodes 1103 and the second transparent electrodes 1104 in the working process.

In the example, the first transparent substrate 1101 is disposed on the viewing side 111 of the transparent display panel 110; the second transparent substrate 1102 is disposed on the rear side 112 of the transparent display panel 110 and is opposite to the first transparent substrate 1101; the two substrates are bonded together through sealant 1106 or the like; and the light adjustment film 1105 is clamped between the two substrates. For instance, the material of the first transparent substrate 1101 and the second transparent substrate 1102 may be transparent materials such as glass base materials or resin base materials. It should be noted that: for instance, the materials of the first transparent substrate 1101 and the second transparent substrate 1102 may be same or different, and may also be any combination of the glass base materials and the resin base materials.

Figure 3A:
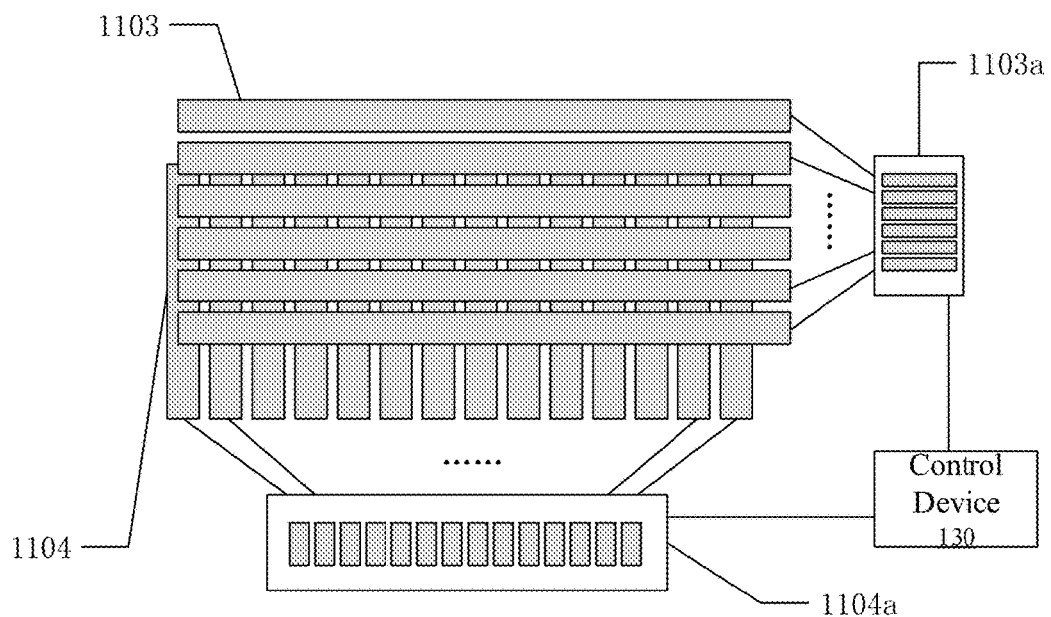
FIG. 3A is a schematic diagram of transparent electrodes in the transparent display panel.
Figure 3B:
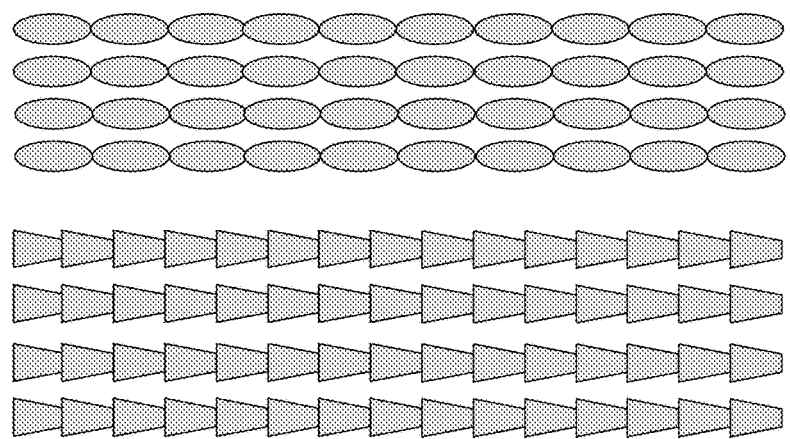
FIG. 3B is a schematic diagram of another transparent electrodes in the transparent display panel.

In the embodiment, as shown in FIGS. 3A and 3B, the first transparent electrodes 1103 are disposed on the first transparent substrate 1101 and are longitudinally arranged along the substrate, and the second transparent electrodes 1104 are disposed on the second transparent substrate 1102 and are transversely arranged along the substrate. It should be noted that the direction of the first transparent electrodes 1103 and the second transparent electrodes 1104 is not limited, as long as intersected and superimposed parts can implement voltage control on the light adjustment film 1105. For instance, the first transparent electrodes 1103 may also be transversely arranged along the first transparent substrate 1101, and the second transparent electrodes 1104 may also be longitudinally arranged along the second transparent substrate 1102. For instance, the material of the plurality of first transparent electrodes 1103 and the plurality of second transparent electrodes 1104 may be transparent conductive materials. For instance, the transparent conductive materials may be the materials of transparent metal oxide such as indium tin oxide (ITO) or indium zinc oxide (IZO).

For instance, the first transparent electrode 1103 and the second transparent electrode 1104 are respectively in signal connection with the control device 130 through leads (not shown in the figure) on the left and right sides of the transparent display panel 110 and a bonding pad 1103$a$ and a bonding pad 1104$a$, so as to input corresponding voltage pulse into the first transparent electrode 1103 and the second transparent electrode 1104. For instance, the independent driving of each electrode is realized.

In the embodiment, as shown in FIG. 3A, the shape of the first transparent electrodes 1103 and the second transparent electrodes 1104 is set to be strip. For instance, each first transparent electrode 1103 is connected with corresponding bonding pad 1103$a$, and each second transparent electrode 1104 is connected with corresponding bonding pad 1104$a$. It should be noted that: as shown in FIG. 3B, for instance, the shape of the first transparent electrodes 1103 and the second transparent electrodes 1104 may also be other shapes such as a diamond, an ellipse, or a polygon. This arrangement mode not only can realize the independent driving of the electrode but also can avoid the optical moiré phenomenon and improve the display resolution.

In the embodiment, as shown in FIG. 2A, the materials of the light adjustment film 1105 may be PDLC, PSLC, EC materials, etc.; and the light adjustment film is disposed between the first transparent electrodes 1103 and the second transparent electrodes 1104 and controlled by the working voltage applied to the first transparent electrodes 1103 and the second transparent electrodes 1104, so as to achieve the switch between the transparent state and the display state. This display state may be a light scattering state or partially transparent state. For example, in particular, only a part or separate parts of the display area of the transparent display panel 110 appear in the light scattering state or the partially transparent state, and this part or parts constitute a pattern that is displayed. Moreover, in the example, the transmittance of the glass substrate is over 95%, the transmittance of liquid crystal material or EC material is over 92%, the transmittance of the transparent electrodes is over 96%, and therefore the overall transmittance of the transparent display panel can be over 80%, even 85%, and thus has a high light transmittance.

For instance, in order to obtain PDLC, low molecular liquid crystals can be mixed with prepolymer; the mixture is subjected to polymerization under certain conditions, so that micron-size liquid crystal droplets can be uniformly dispersed in the polymer network; and the PDLC obtains materials having electro-optical response characteristics by utilization of the dielectric anisotropy of liquid crystal molecules, can work between a scattering state and a transparent state, and has a certain grayscale.

Moreover, for instance, the type of the EC materials is not limited in the embodiment of the present disclosure. For instance, the EC materials may include tungsten trioxide, polythiophenes and derivatives thereof, viologens, tetrathiafulvalene or metal phthalocyanines, and can switch between a transparent state and a colored state under the action of applied electrical field.

For instance, the control device 130 inputs voltage pulse into the first transparent electrodes 1103 and the second transparent electrodes 1104, controls the properties of the materials in the light adjustment film 1105 by changing the voltage applied to the first transparent electrodes 1103 and the second transparent electrodes 1104, and then controls the transparent display panel 110 to switch between the non-transparent state and the transparent state. For instance, the control device 130 applies driving signals to the first transparent electrodes 1103 in a progressive manner, provides voltage corresponding to display data for the second transparent electrodes 1104, and then controls the display of the image information on the transparent display panel 110.

The example controls the properties of the materials of the light adjustment film 1105 through the control device 130, controls the transparent display panel 110 to switch between the non-transparent state and the transparent state, and then achieves the transparent display of the image information by the transparent display panel 110. Further, for the part (or the whole), which is in the non-transparent state, of the transparent display panel 110, the image information projected upon the part (or the whole) by the projecting apparatus 120 can be watched by viewers.

Figure 2B:
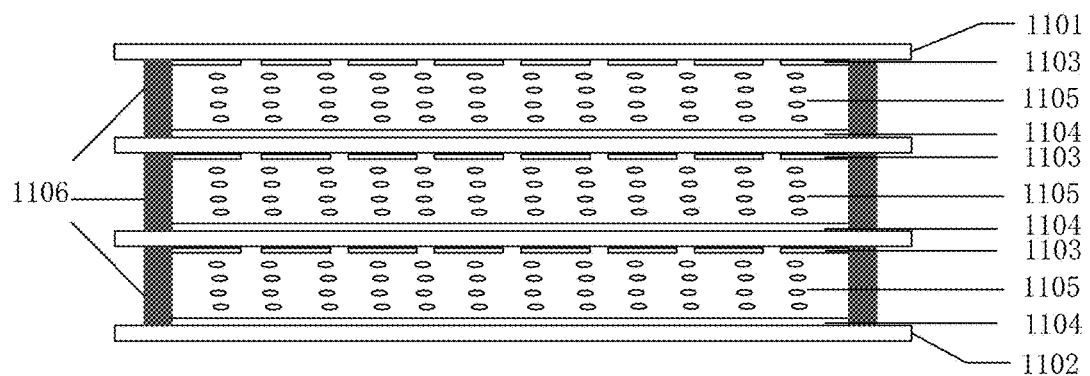
FIG. 2B is a schematic structural view of a transparent display panel of a second example in the transparent display system as shown in FIG. 1A.

In the second example, as shown in FIG. 2B, the transparent display panel 110 is a transparent display panel structure including a plurality of (e.g., three) light adjustment structural layers as shown by the first example, and these light adjustment structural layers are arranged by up-and-down overlapping means to facilitate the production of the transparent display panel 110. For instance, two adjacent light adjustment films share one substrate which is respectively taken as a lower substrate 1102 of the upper light adjustment film 1105 and an upper substrate 1101 of the lower light adjustment film 1105. For instance, in the example of taking a liquid crystal layer as the light adjustment film, the transparent display panel 110 may further include alignment films (not shown in the figure) which are disposed on two sides of the light adjustment film 1105. The alignment film may be a polyimide (PI) film, etc.

In the example, the light adjustment film 1105 is a colored holographic polymer dispersed liquid crystal (H-PDLC) layer. For instance, the light adjustment films 1105 from the first layer to the third layer may sequentially include a red H-PDLC layer, a blue H-PDLC layer and a green H-PDLC layer, which are combined together to achieve color display. It should be noted that the light adjustment films 1105 from the first layer to the third layer are not limited to the RGB sequence and may also be in other sequences, or may also be in other colors, as long as these light adjustment films can be combined together to achieve color display.

For instance, the control device 130 simultaneously inputs voltage signals into the first transparent electrodes 1103 in each layer so as to simultaneously and progressively switch on the first transparent electrodes 1103 in each layer, respectively provides voltage signals corresponding to display data for the second transparent electrodes 1104 in each layer, and then controls the properties of each light adjustment film 1105 to obtain corresponding display grayscale. The display grayscale of each layer is transmitted to the viewing side 111 of the transparent display panel 110 and superimposed to achieve the display of sub-pixels. Moreover, for instance, the control device 130 may control the red H-PDLC layer to achieve display and control the blue H-PDLC layer and the green H-PDLC layer to be in transparent state, and then realizes the red display of corresponding sub-pixels. It should be noted that the control device 130 may also realize the blue or green display of corresponding sub-pixels by control.

The example realizes the transparent color display of the transparent display panel 110 by control of the transmission and the display of a plurality of colored H-PDLC layers, and obviously improves the display effect of the transparent display panel 110 while ensuring high transmittance.

It should be noted that: for instance, in other examples, the transparent display panel 110 may also be an LCD transparent display panel or an OLED transparent display panel. The specific implementation may refer to the conventional technical proposal.

For instance, the LCD transparent display panel includes an LCD panel and backlight units (BLUs) disposed on a non-display side of the LCD panel. The BLU includes a transparent light guide plate (LGP) and a light source disposed on a side surface of the transparent LGP. The light source may be a cold cathode fluorescence lamp or an LED. The control device 130 controls the display of the liquid crystal transparent display panel by control of the deflection property of liquid crystals in the LCD panel.

For instance, each sub-pixel of the OLED transparent display panel not only includes a display area but also includes a transparent part to allow light from the rear side to run through, so the technical effects of display and transparency can be realized.

The projecting apparatus 120 is configured to project image information on the rear side 112 of the transparent display panel, and the image information is displayed on the viewing side 111 of the transparent display panel 110, through the transparent display panel 110. The distance from the projecting apparatus 120 to the transparent display panel 110, for instance, may satisfy the condition that the projection area of the projecting apparatus 120 on the rear side of the transparent display panel 110 is less than or equal to a display region of the transparent display panel 120, so that the projecting apparatus 120 can project all the image information on the transparent display panel 110. In the embodiment, the projecting apparatus 120 is a short throw projector with the throw ratio of 0.2-1.0, e.g., an ultra-short throw projector with the throw ratio of 0.2 to 0.4. For instance, the short throw projector may adopt an appropriate type, e.g., a fish-eye short throw projector or a reflective short throw projector. Of course, the projecting apparatus 120 may also be a short throw projector of other types. The projecting apparatus 120 achieves shorter focal lengths on the premise of ensuring the image quality, facilities installation, reduces the thickness of the entire transparent display system, and reduces the possible impact of the external environment on the projection quality.

Figure 4:
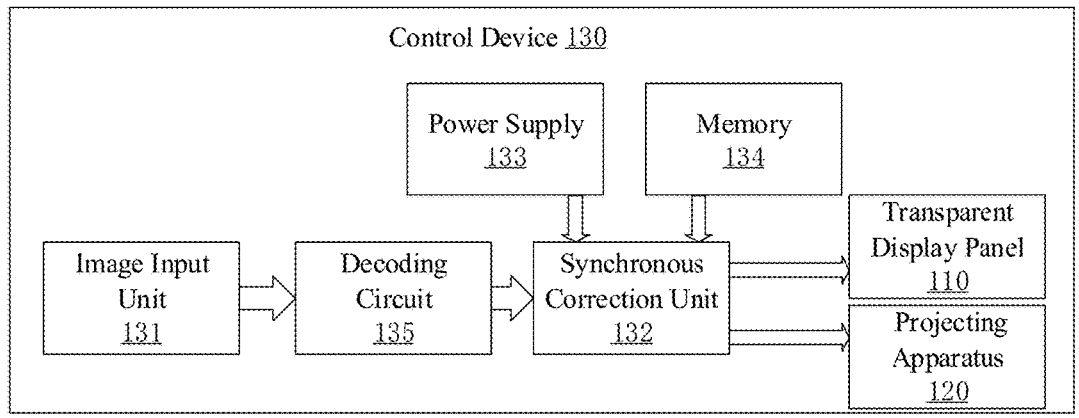
FIG. 4 is a block diagram of a control device in the transparent display system as shown in FIG. 1A.

In the embodiment, as shown in FIG. 4, the control device 130 includes an image input unit 131, a synchronous correction unit 132, a power supply 133, a memory 134 and a decoding circuit 135, and is configured to control the synchronization of the display operation of the transparent display panel 110 and the projection display operation of the projecting apparatus 120. In the embodiment, the control device 130 may be various kinds of devices capable of realizing the control function, e.g., a central processing unit (CPU) or a data signal processor (DSP), and may also be implemented by means such as semiconductor chip or field programmable gate array (FPGA).

For instance, the control device 130 may include a processor and a memory. The processor may be a CPU or a processing unit of other types having data processing capability and/or instruction execution capability, may be a general purpose processor or a special purpose processor, and may be a processor based on X86 or ARM architecture. The memory may include one or more computer program products. The computer program products may include computer readable storage media of various forms, e.g., volatile memories and/or nonvolatile memories. The volatile memory, for instance, include a random access memory (RAM) and/or a cache. The nonvolatile memory, for instance, may include a read-only memory (ROM), a hard disc, a flash memory, etc. One or more computer program instructions may be stored on the computer readable storage medium. The processor may run the program instructions to realize the functions in the embodiment of the present disclosure (implemented by the processor) and/or other expected functions such as coding/decoding and synchronous correction. Various kinds of applications and various kinds of data, e.g., face data and various kinds of data used and/or generated by the applications, may also be stored in the computer readable storage media.

The image input unit 131 is configured to receive the image information required to be displayed by the transparent display panel 110 and the projecting apparatus 120. The image information received by the image input unit 131 may be image information which is outputted by a player such as a computer and a VCD and then decoded by the decoding circuit 135. The image input unit 131 not only has image receiving function but also has image processing function, so as to output image data required by the synchronous correction unit 132. The image input unit 131 may be implemented by a circuit, for instance, may adopt the conventional image input circuit, etc. No further description will be given here.

Figure 5A:
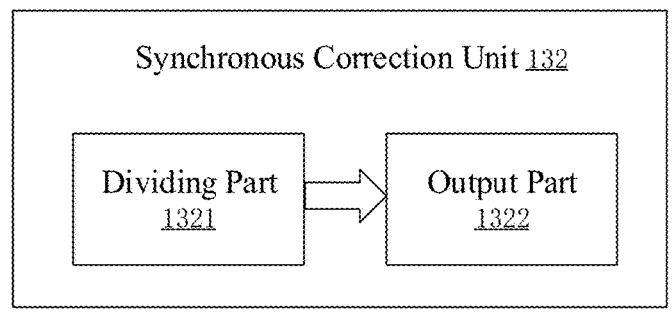
FIG. 5A is a block diagram of a synchronous correction unit in the control device as shown in FIG. 4.

In one example of the embodiment, as shown in FIG. 5A, the synchronous correction unit 132 includes a dividing part 1321 and an output part 1322, and is configured to control the synchronization of the display operation of the transparent display panel 110 and the display operation of the image information by the projection of the projecting apparatus 120.

The dividing part 1321 is configured to divide single frame of image information into two paths of identical image information. The output part 1322 is configured to simultaneously send the two paths of identical image information to the projecting apparatus 120 and the transparent display panel 110 to realize the synchronous output of the image information. For instance, the dividing part 1321 obtains two paths of identical sub-videos with full video formats by the division of the image information inputted by the image input unit 131, and the outputted two paths of sub-videos have same scanning rules. For instance, in the embodiment, the inputted image information is cached through an external cache part 134, so as to facilitate the subsequent preset read-write operations. The output part 1322, for instance, outputs the divided two paths of image information to a video coding output circuit, so that image signals outputted to the transparent display panel 110 and the projecting apparatus 120 can meet the standard timing requirements.

Figure 5B:
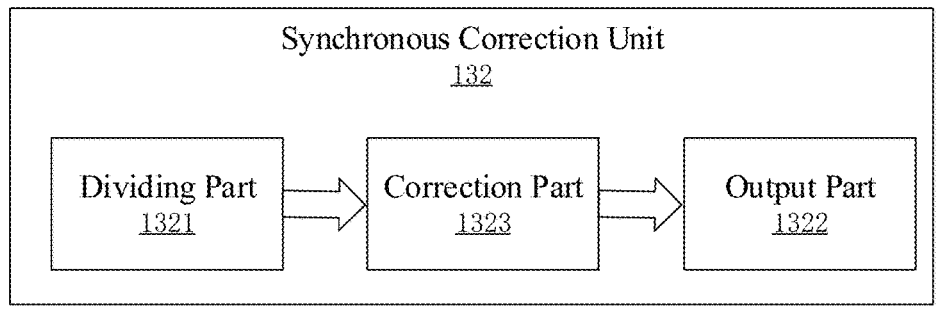
FIG. 5B is a block diagram of another synchronous correction unit in the control device as shown in FIG. 4.

FIG. 5B is a block diagram of another synchronous correction unit in the control device as shown in FIG. 4. As shown in FIG. 5B, in the example, the synchronous correction unit 132 not only includes the dividing part 1321 and the output part 1322 but also includes a correction part 1323 which is configured to correct the distorted image information so as to improve the resolution of the image information.

For instance, the correction part 1323 performs parallel processing on the two paths of image information generated by the dividing part 1321. The two paths of image information are respectively corrected by respective independent image processing channels, for instance, so as to be respectively applicable to the display requirements of the transparent display panel and the projecting apparatus. For instance, the correction of the correction part 1323 may adopt interpolation amplification algorithm. The two paths of image information obtained after correction are subsequently transmitted to the transparent display panel 110 and the projecting apparatus 120 respectively through the output part 1322. The synchronous correction unit 132 may be implemented by, e.g., hardware, software, firmware or any combination thereof. For instance, the synchronous correction unit 132 is a synchronous correction circuit which respectively includes a division sub-circuit, an output sub-circuit and a correction sub-circuit.

For instance, after the image input unit 131 receives the image information decoded by the decoding circuit 135, image information data may be subjected to preprocessing, e.g., adjustment of parameters such as image size and resolution, to obtain preprocessed image information, and subsequently, the preprocessed image information is sent to the dividing part 1321. The dividing part 1321 divides the image information into two paths of identical image information, and the output part 1322 simultaneously sends the two paths of image information to the transparent display panel 110 and the projecting apparatus 120, so as to control the transparent display panel 110 and the projecting apparatus 120 to simultaneously display the same image information.

In at least an embodiment of the present disclosure, for instance, the resolution of the image projected by the projecting apparatus 120 on the rear side of the transparent display panel 110 is the same with the resolution of the image displayed by the transparent display panel 110, so that better display effect can be achieved by the superimposition of the image displayed by the transparent display panel 110 and the image projected by the projecting apparatus 120.

In at least an embodiment of the present disclosure, for instance, an anti-reflection layer is disposed on an outer surface of the viewing side 111 of the transparent display panel 110. For instance, as shown in FIG. 2A, the anti-reflection layer 1110 is disposed on an outer surface of the first substrate 1101. For instance, the structure of the anti-reflection layer is not limited in the embodiment of the present disclosure, and the anti-reflection layer may be a single layer or multiple layers. For instance, the material of the anti-reflection layer may be SiO2 or other silicon compounds. The anti-reflection layer not only reduces the reflecting rate of the surface of the display panel to increase the transparency of the transparent display panel 110, but also has the function of protecting the transparent display panel 110.

Figure 1B:
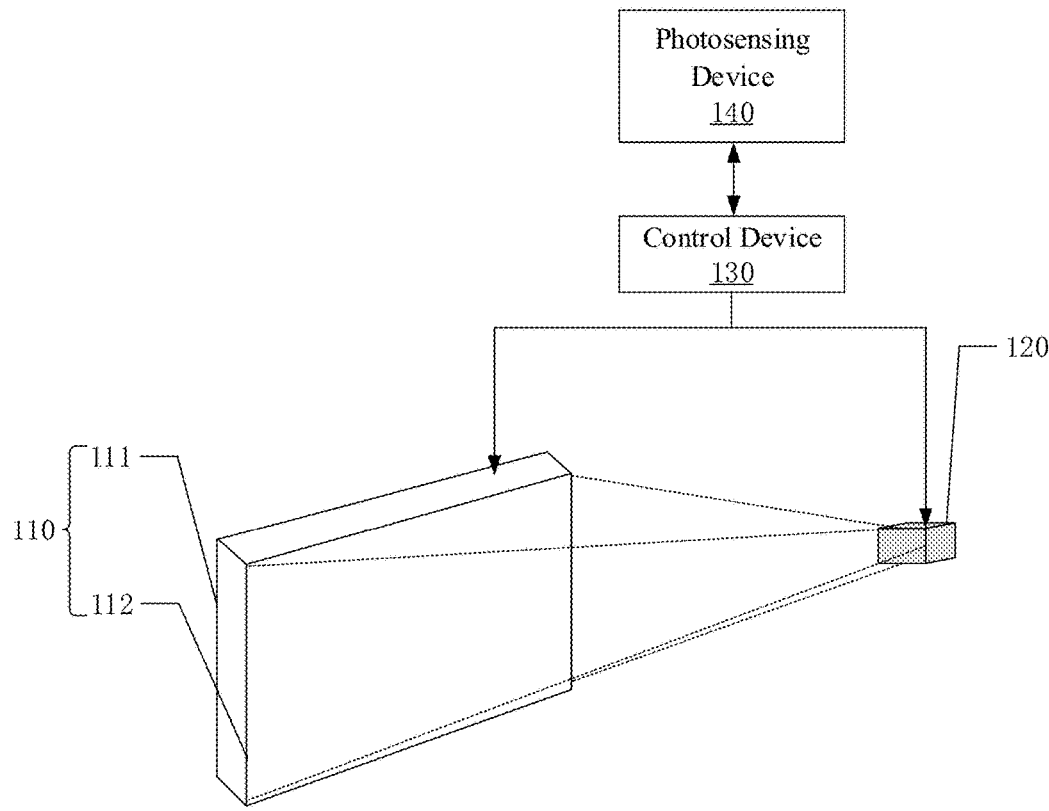
FIG. 1B is a schematic diagram of another transparent display system provided by another embodiment of the present disclosure.

FIG. 1B is a schematic diagram of another transparent display system provided by another embodiment of the present disclosure. As shown in FIG. 1B, the transparent display system not only comprises the transparent display panel 110, the projecting apparatus 120 and the control device 130 but also comprises a photosensing device 140 which is configured to detect the brightness variation in the surrounding environment. For instance, the photosensing device 140 may be a light brightness sensing electronic device including a light sensor, etc. The light sensor, for instance, may include a photosensitive element such as a photodiode or a phototransistor, and outputs current or voltage signals that reflect the light intensity. The signals may be subjected to analog-to-digital conversion to obtain digital signals which are then used by the control device 130.

For instance, the photosensing device 140 sends sensed brightness information in the surrounding environment to the control device 130, and the control device 130 adjusts the display brightness of the transparent display panel 110 or the projection brightness of the projecting apparatus 120 according to the brightness information, so as to obtain the best display brightness or desired display brightness for human eyes.

Figure 6A:
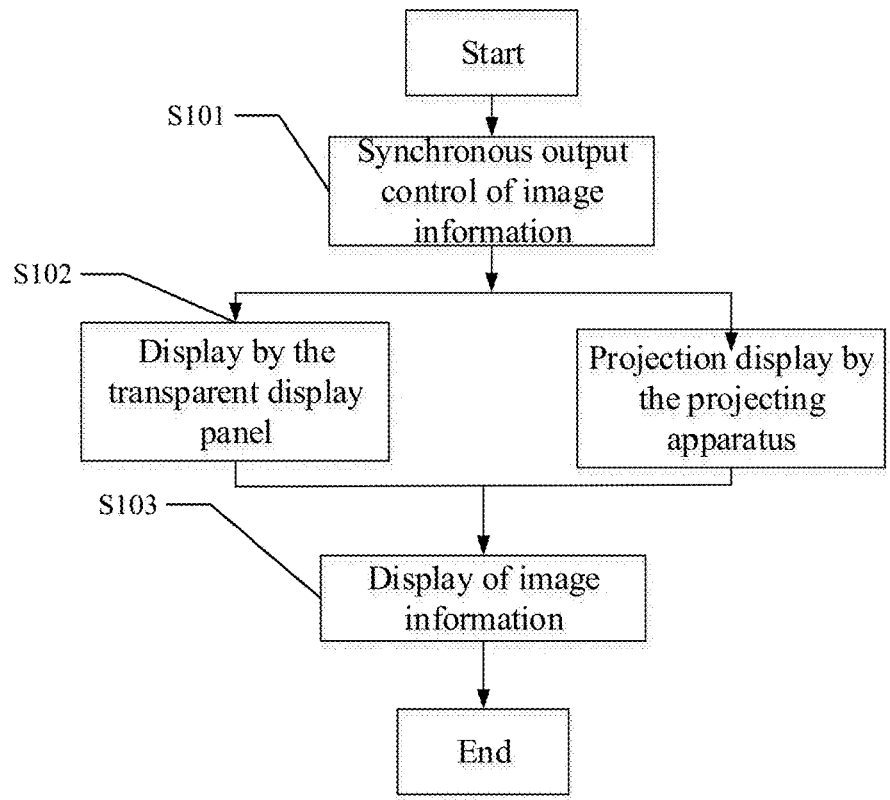
FIG. 6A is a flowchart of a display method of a transparent display system provided by an embodiment of the present disclosure.
Figure 6B:
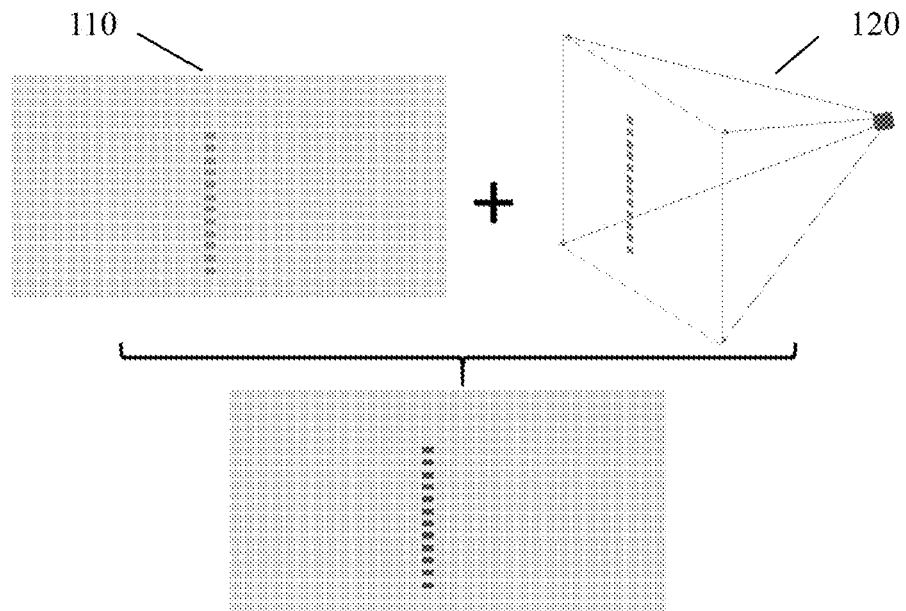
FIG. 6B is a flowchart of a display method of a transparent display system provided by the embodiment of the present disclosure.

FIG. 6A illustrates a transparent display method provided by an embodiment of the present disclosure; FIG. 6B is a flowchart of a display method of a transparent display system provided by the embodiment of the present disclosure. The method, for instance, may be applied to the transparent display system provided by at least an embodiment described above. The method may comprise the following steps:

Step S101: controlling the synchronization of image information displayed by a transparent display panel and image information projected by a projecting apparatus.

In the above embodiment, for instance, the control device 130 is adopted to simultaneously output the same image information to the transparent display panel 110 and the projecting apparatus 120, so as to realize the display synchronization of the image information displayed by the transparent display panel 110 and the image information projected by the projecting apparatus 120.

In an example, as illustrated in FIG. 6B, provided that the image information to be displayed is a first vertical bar in the central part of the display area of the transparent display panel. For example, this transparent display panel is the transparent display panel 110 as illustrated in FIG. 2A or FIG. 2B, and according to the received image information, the central part corresponding to the first vertical bar of the transparent display panel 110 is switched from the transparent state to the light scattering state, thus the transparent display panel 110 displays the first vertical bar at a certain grey scale. In synchronization with the transparent display panel 110, the projecting apparatus 120 projects an image which has a second vertical bar (e.g., a colorful vertical bar) at the central part of the image onto the transparent display panel 110, and the second vertical bar is presented to viewers via the light scattering part (i.e., the part corresponding to the first vertical bar displayed by the transparent display panel 110) of the transparent display panel 110, and the finally displayed vertical bar can be colorful if the second vertical bar is colorful. In this way, the first image information by the transparent display panel 110 and the second image information by the projecting apparatus 120 are superposed to realize the final display. During the display operation, the rest part(s) of the transparent display panel 110 is kept in the transparent state, and the viewers can see the background or exhibits behind the transparent display panel 110 through the part(s) in the transparent state.

Step S102: allowing the transparent display panel to display the image information on the viewing side; and allowing the projecting apparatus to project the image information on the rear side of the transparent display panel for display.

In the above embodiment, for instance, one path of voltage signals of image information, outputted by the control device 130 to the transparent display panel 110, are transmitted to the first transparent electrodes 1103 and the second transparent electrodes 1104 of the transparent display panel 110, and the state of the material of the light adjustment film 1105 is controlled by the voltage on the first transparent electrodes 1103 and the second transparent electrodes 1104, so as to display corresponding image information on the viewing side 111 of the transparent display panel 110.

For instance, the control device 130 outputs another path of identical image information signals to the projecting apparatus 120. The projecting apparatus 120 projects corresponding image information on the rear side 112 of the transparent display panel 110.

S103: displaying image information, obtained after the superimposition of the two paths of image information, on the viewing side of the transparent display panel.

In the above embodiment, for instance, the image information projected by the projecting apparatus 120 on the rear side 112 of the transparent display panel 110 is displayed on the viewing side 111 through the transparent display panel 110, and is superimposed with the image information displayed on the viewing side 111 of the transparent display panel 110, so as to achieve high-transparency display of the image information.

In the transparent display system and the display method thereof, provided by an embodiment of the present disclosure, the image information of the transparent display panel and the image information projected by the projecting apparatus are subjected to synchronous display, and the colored image information projected by the projecting apparatus is superimposed on the image information of the transparent display panel, so the embodiment not only can achieve high-transparency display but also can obviously improves the transparent display effect.

Figure 7:
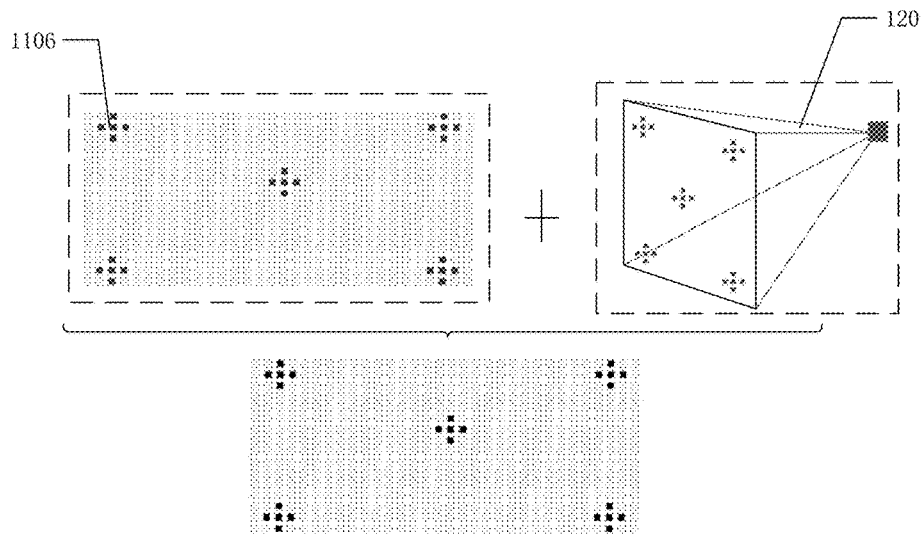
FIG. 7 is a schematic diagram of alignment detectors in a transparent display system provided by another embodiment of the present disclosure.
Figure 8:
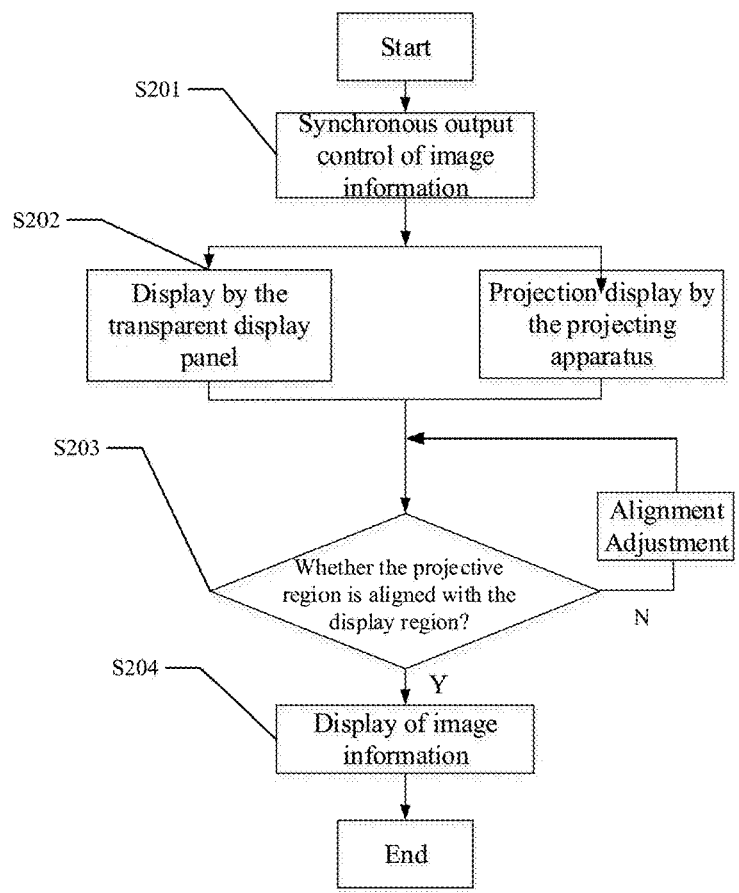
FIG. 8 is a flowchart of a display method of a transparent display system provided by another embodiment of the present disclosure.

FIG. 7 is a schematic diagram of alignment detectors in a transparent display system provided by another embodiment of the present disclosure. FIG. 8 is a flowchart of a display method of the transparent display system provided by another embodiment of the present disclosure. Description will be given below to the transparent display system and the display method thereof, provided by another embodiment of the present disclosure, with reference to FIGS. 7 and 8.

In the transparent display system provided by at least an embodiment of the present disclosure, the transparent display panel 110 further includes alignment detectors 1106 disposed at preset positions. The alignment detectors 1106 are configured to acquire signals irradiated by the projecting apparatus 120, and feed back the detection result to the control device 130. The control device 130 detects whether a projective region of the projecting apparatus 120 on the transparent display panel 110 is aligned with a preset region of the transparent display panel 110 according to the detection result, so that the image information displayed by the transparent display panel and the projecting apparatus can be superimposed to each other, and hence the errors such as misalignment can be avoided.

In the embodiment, as shown in FIG. 7, the alignment detectors 1106 are disposed at four corners and in the center of the transparent display panel 110. It should be noted that the position of the alignment detector 1106 may be determined by the specific shape of the panel, as long as the transparent display panel 110 and the projecting apparatus 120 can be successfully aligned. For instance, the alignment detector 1106 may be a photosensitive element including a light sensor.

For instance, the projecting apparatus 120 projects corresponding marks on the transparent display panel 110; the alignment detectors 1106 feed back the detection results of corresponding marks projected by the projecting apparatus 120 to the control device 130; and the control device 130 determines whether the transparent display panel 110 and the projecting apparatus 120 are successfully aligned. For instance, if the alignment detectors 1106 detect corresponding marks, the image information displayed by the transparent display panel 110 may be completely coincident with the image information displayed by the projecting apparatus 120; and if corresponding mark cannot be detected, the control device 130 continuously adjusts the projection position of the projecting apparatus 120, until the alignment detectors 1106 detect corresponding marks projected by the projecting apparatus 120, and subsequently, display operation can be performed.

Alignment detection may also be implemented by alignment marks in the image information on the viewing side 111 of the transparent display panel 110 and the image information projected by the projecting apparatus 120 on the rear side 112 of the transparent display panel 110. For instance, an image acquisition unit may be adopted to acquire (e.g., capture) a display image from the viewing side 111, and feed back the image to the control device 130 to determine whether they are aligned. For instance, the alignment marks may be acquired from an image acquisition unit including a complementary metal oxide semiconductor (CMOS) sensor, a charge-coupled device (CCD) sensor, etc. For instance, the image acquisition unit sends the acquired image, including the alignment marks in the image information on the viewing side 111 of the transparent display panel 110 and the image information projected by the projecting apparatus 120 on the transparent display panel 110, to the control device 130, and the control device 130 can analyze whether the alignment marks in the two paths of image information in the image are coincident or not, for instance, whether the deviation between the alignment marks is within a visually acceptable range. If the alignment marks on the viewing side 111 of the transparent display panel 110 are completely coincident with the alignment marks projected by the projecting apparatus 120 on the rear side 112 of the transparent display panel 110, the alignment is successful; and if they are not completely coincident, the control device 130 continuously adjusts the projection position of the projecting apparatus 120, until the deviation of the alignment marks is within the visually acceptable range, for instance, until the alignment marks are completely coincident. It should be noted that: for instance, the alignment operation of the transparent display panel 110 and the projecting apparatus 120 may be that the detection and the fixation of the transparent display panel 110 and the projecting apparatus 120 are completed before the transparent display system leaves the factory.

As shown in FIG. 8, the display method of the transparent display system provided by another embodiment of the present disclosure comprises the following steps:

S201: controlling the synchronization of the image information displayed by the transparent display panel and the image information projected by the projecting apparatus.

In the above embodiment, for instance, the control device 130 simultaneously outputs the same image information to the transparent display panel 110 and the projecting apparatus 120, so as to synchronize the image information displayed by the transparent display panel 110 and the image information projected by the projecting apparatus 120.

S202: allowing the transparent display panel to display the image information on the viewing side; and allowing the projecting apparatus to project the image information on the rear side of the transparent display panel for display.

In one example of the above embodiment, the transparent display panel 110 includes first transparent electrodes 1103, second transparent electrodes 1104 and a light adjustment film disposed between the first and second transparent electrodes. In the example, for instance, one path of voltage signals of image information, outputted by the control device 130 to the transparent display panel 110, are transmitted to the first transparent electrodes 1103 and the second transparent electrodes 1104 of the transparent display panel 110, and the state of the light adjustment film 1105 is controlled by voltage pulse on the first transparent electrodes 1103 and the second transparent electrodes 1104, so as to display corresponding image information on the viewing side 111 of the transparent display panel 110.

For instance, the control device 130 outputs another path of identical image information signals to the projecting apparatus 120. The projecting apparatus projects corresponding image information on the rear side 112 of the transparent display panel 110 for display.

S203: detecting whether a projective region of the projecting apparatus on the rear side of the transparent display panel is aligned with a preset region of the transparent display panel, executing the step S204 if so, or continuing to execute the step S203 if not.

For instance, alignment detectors 1106 are adopted to detect corresponding marks projected by the projecting apparatus 120 or an image acquisition unit is adopted to acquire alignment marks in the image information displayed on the viewing side 111 of the transparent display panel 110 and alignment marks in the image information projected by the projecting apparatus 120 on the rear side 112 of the transparent display panel 110, and detect whether the alignment marks of both are coincident.

S204: displaying image information, obtained by the superimposition of the two paths of image information, on the viewing side of the transparent display panel.

For instance, the image information, projected by the projecting apparatus 120 on the rear side 112 of the transparent display panel 110, is displayed on the viewing side 111 through the transparent display panel 110, and is superimposed to the image information displayed on the viewing side 111 of the transparent display panel 110, so as to achieve high-transparency display of the image information.

In the transparent display system and the display method thereof, provided by another embodiment of the present disclosure, the transparent display panel 110 and the projecting apparatus 120 align the image information through the alignment detectors, so as to effectively avoid the phenomenon that the image information displayed on the viewing side 111 of the transparent display panel 110 is not completely coincident with the image information projected by the projecting apparatus 120 on the transparent display panel 11. Thus, the display quality of the transparent display system provided by the embodiment can be effectively improved.

What are described above is related to the illustrative embodiments of the disclosure only and not limitative to the scope of the disclosure; the scopes of the disclosure are defined by the accompanying claims.

What is claimed is:

1. A transparent display system, comprising a transparent display panel, a projecting apparatus, a control device and a photosensing device,
    wherein the transparent display panel includes a viewing side and a rear side opposite to the viewing side and is configured to display image information on the viewing side;
    the projecting apparatus is configured to project image information on the rear side of the transparent display panel;
    the control device is configured to control synchronization between a display operation of the transparent display panel and a projection display operation of the projecting apparatus, and
    the photosensing device is configured to detect brightness variation in a surrounding environment;
    wherein the control device is further configured to adjust display brightness of the transparent display panel or projection brightness of the projecting apparatus according to a detection result of the photosensinq device.

2. The transparent display system according to claim 1, wherein a projection area of the projecting apparatus on the rear side of the transparent display panel is less than or equal to a display region of the transparent display panel.

3. The transparent display system according to claim 1, wherein a resolution of an image projected by the projecting apparatus on the rear side of the transparent display panel is identical to a resolution of an image displayed by the transparent display panel.

4. The transparent display system according to claim 1, wherein an anti-reflection layer is provided on an outer surface of the viewing side of the transparent display panel.

5. The transparent display system according to claim 1, wherein the transparent display panel includes first transparent electrodes, second transparent electrodes and a light adjustment film, and
    the light adjustment film is disposed between the first transparent electrodes and the second transparent electrodes.

6. The transparent display system according to claim 5, wherein the light adjustment film is a polymer dispersed liquid crystal (PDLC) layer, a polymer stabilized liquid crystal (PSLC) layer or an electrochromic (EC) material layer.

7. The transparent display system according to claim 1, wherein the transparent display panel includes a plurality of light adjustment structural layers superimposed to each other;
    each of the light adjustment structural layers includes a first transparent electrode, a second transparent electrode and a light adjustment film and the light adjustment film is disposed between the first transparent electrode and the second transparent electrode.

8. The transparent display system according to claim 7, wherein the light adjustment film is a PDLC layer, a PSLC layer or an EC material layer.

9. The transparent display system according to claim 7, wherein the plurality of light adjustment structural layers that superimposed are respectively configured to display different colors.

10. The transparent display system according to claim 1, wherein the projecting apparatus is a short throw projector with a throw ratio in a range of 0.2 to 1.0.

11. The transparent display system according to claim 7, wherein the short throw projector is a fish-eye short throw projector or a reflective short throw projector.

12. The transparent display system according to claim 1, wherein the control device includes:
    an image input unit configured to receive image information required to be displayed by the transparent display panel and the projecting apparatus; and
    a synchronous correction unit configured to control the synchronization between the display operation of the transparent display panel and the projection display operation of the projecting apparatus.

13. The transparent display system according to claim 12, wherein the synchronous correction unit includes a dividing part and an output part,
    wherein the dividing part is configured to divide a single frame of image information into two paths of identical image information; and
    the output part is configured to simultaneously send the two paths of identical image information to the projecting apparatus and the transparent display panel so as to realize synchronous output of the image information.

14. The transparent display system according to claim 13, wherein the synchronous correction unit further includes a correction part, and
    the correction part is configured to correct distorted image information so as to improve a resolution of the image information.

15. The transparent display system according to claim 1, wherein the transparent display panel further includes alignment detectors disposed at preset positions,
    wherein the alignment detectors are configured to acquire signals irradiated by the projecting apparatus and feed back detection results to the control device; and
    the control device is further configured to detect whether a projective region of the projecting apparatus on the rear side of the transparent display panel is aligned with a preset region of the transparent display panel.

16. A display method, for the transparent display system according to claim 1, comprising:
    allowing the transparent display panel to display the image information on the viewing side;
    allowing the projecting apparatus to project the image information on the rear side of the transparent display panel for display; and controlling the synchronization of the image information displayed by the transparent display panel and the image information projected by the projecting apparatus.

17. The display method according to claim 16, further comprising:
detecting whether a projective region of the projecting apparatus on the rear side of the transparent display panel is aligned with a preset region of the transparent display panel.

* * * * *